US012650834B2

(12) United States Patent
Roy et al.

(10) Patent No.: US 12,650,834 B2
(45) Date of Patent: Jun. 9, 2026

(54) CONTINUOUS DEPLOYMENT OF MICROSERVICES OR OTHER APPLICATIONS USING SEPARATE SOURCE AND DEPLOYMENT REPOSITORIES

(71) Applicant: Dell Products L.P., Round Rock, TX (US)

(72) Inventors: Amitava Roy, Lexington, MA (US); Stephen S. Flynn, Brookline, MA (US)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 18/648,042

(22) Filed: Apr. 26, 2024

(65) Prior Publication Data
US 2025/0335184 A1     Oct. 30, 2025

(51) Int. Cl.
*G06F 8/71*        (2018.01)
*G06F 8/60*        (2018.01)
*G06F 11/3668*     (2025.01)

(52) U.S. Cl.
CPC ................. *G06F 8/71* (2013.01); *G06F 8/60* (2013.01); *G06F 11/3688* (2013.01)

(58) Field of Classification Search
None
See application file for complete search history.

(56) References Cited

U.S. PATENT DOCUMENTS 9,430,229 B1 * 8/2016 Van Zijst ............. G06F 9/3844
2007/0250574 A1 * 10/2007 Tseitlin .................... G06F 8/71
709/205

2014/0040656 A1 * 2/2014 Ho ........................ G06F 9/5077
718/1
2024/0111523 A1 * 4/2024 Kumawat ................ G06F 8/71
2024/0419917 A1 * 12/2024 Clement ............... G06N 3/045
2025/0103325 A1 * 3/2025 Fu ............................ G06F 8/33
2025/0315364 A1 * 10/2025 Kandoi ................ G06F 11/368

OTHER PUBLICATIONS

M. K. Abhishek et al., "Framework to Deploy Containers using Kubernetes and CI/CD Pipeline," International Journal of Advanced Computer Science and Applications, vol. 13, No. 4, Jan. 2022, pp. 522-526.

* cited by examiner

*Primary Examiner* — Philip Wang
(74) *Attorney, Agent, or Firm* — Ryan, Mason & Lewis, LLP

(57)        ABSTRACT

A method in one embodiment comprises implementing a first process for carrying out an application deployment configuration change using a deployment repository, and implementing a second process for carrying out an application logic change using a source repository, the second process being different than the first process. The method further comprises identifying a particular type of change to be made to at least one application, and controlling execution of a particular sequence of one or more instances of at least one of the first process and the second process responsive to identification of the particular type of change to be made to the at least one application. The deployment repository and the source repository are illustratively part of a continuous integration/continuous deployment (CI/CD) system. The CI/CD system controls software code for applications executed by host devices of a host platform coupled to the CI/CD system over at least one network.

20 Claims, 9 Drawing Sheets

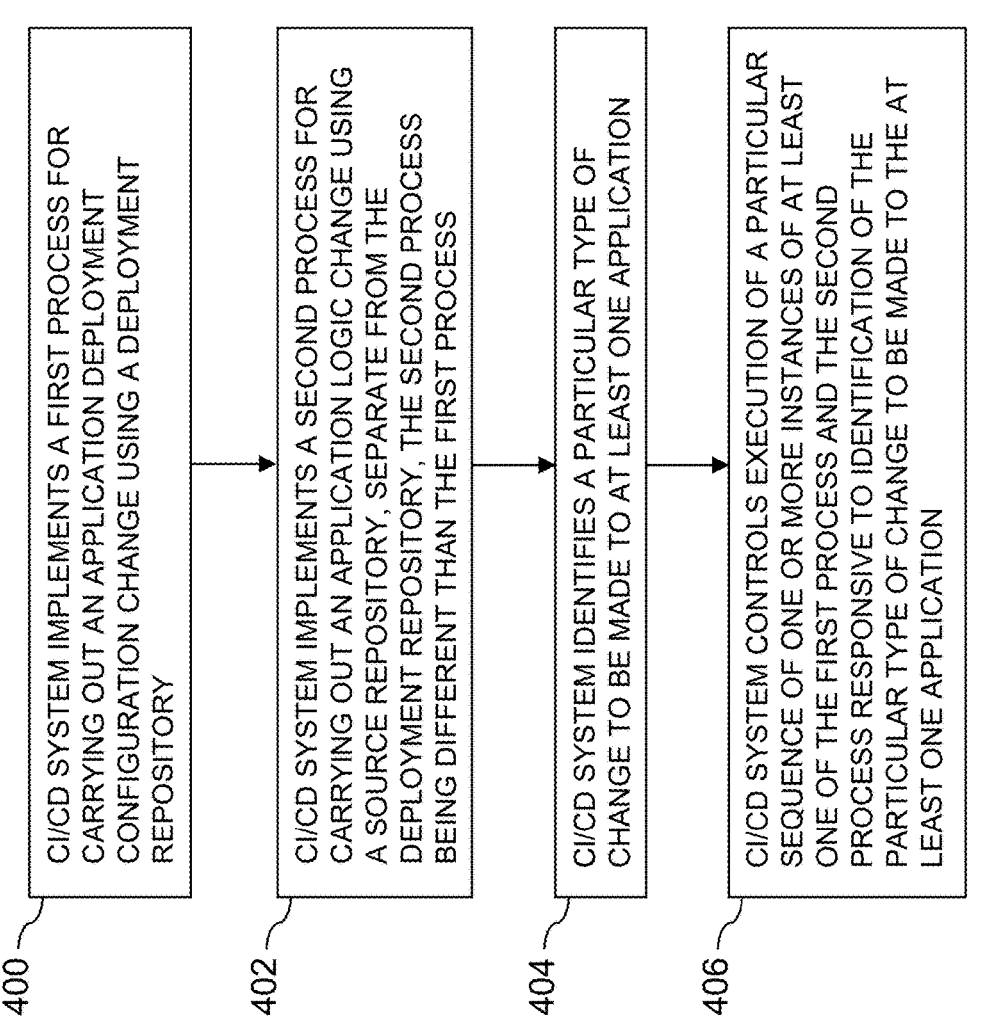

400 — CI/CD SYSTEM IMPLEMENTS A FIRST PROCESS FOR CARRYING OUT AN APPLICATION DEPLOYMENT CONFIGURATION CHANGE USING A DEPLOYMENT REPOSITORY

402 — CI/CD SYSTEM IMPLEMENTS A SECOND PROCESS FOR CARRYING OUT AN APPLICATION LOGIC CHANGE USING A SOURCE REPOSITORY, SEPARATE FROM THE DEPLOYMENT REPOSITORY, THE SECOND PROCESS BEING DIFFERENT THAN THE FIRST PROCESS

404 — CI/CD SYSTEM IDENTIFIES A PARTICULAR TYPE OF CHANGE TO BE MADE TO AT LEAST ONE APPLICATION

406 — CI/CD SYSTEM CONTROLS EXECUTION OF A PARTICULAR SEQUENCE OF ONE OR MORE INSTANCES OF AT LEAST ONE OF THE FIRST PROCESS AND THE SECOND PROCESS RESPONSIVE TO IDENTIFICATION OF THE PARTICULAR TYPE OF CHANGE TO BE MADE TO THE AT LEAST ONE APPLICATION

Figure 5A:
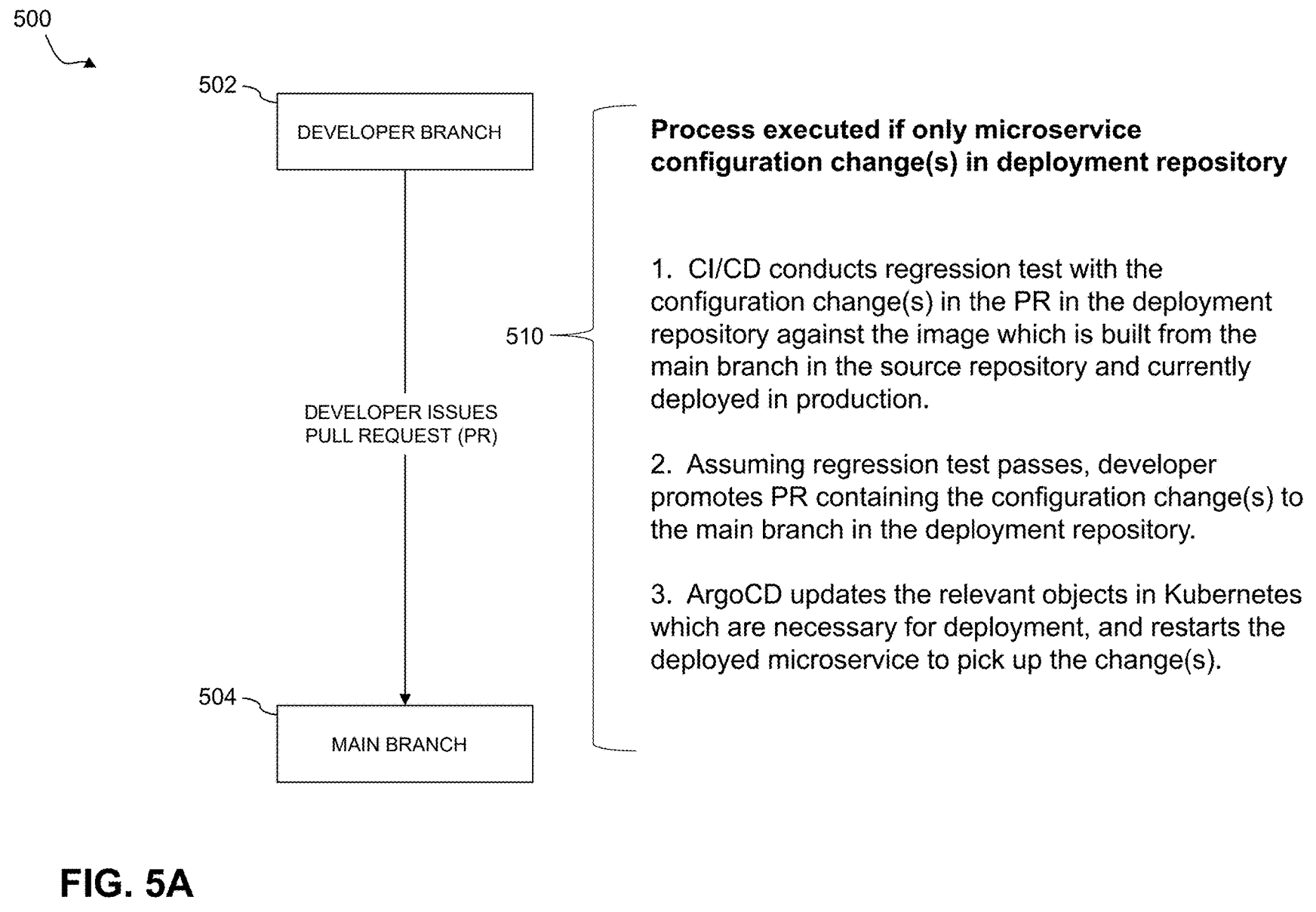

502 — DEVELOPER BRANCH

510

DEVELOPER ISSUES
PULL REQUEST (PR)

504 — MAIN BRANCH

**Process executed if only microservice
configuration change(s) in deployment repository**

1. CI/CD conducts regression test with the
configuration change(s) in the PR in the deployment
repository against the image which is built from the
main branch in the source repository and currently
deployed in production.

2. Assuming regression test passes, developer
promotes PR containing the configuration change(s) to
the main branch in the deployment repository.

3. ArgoCD updates the relevant objects in Kubernetes
which are necessary for deployment, and restarts the
deployed microservice to pick up the change(s).

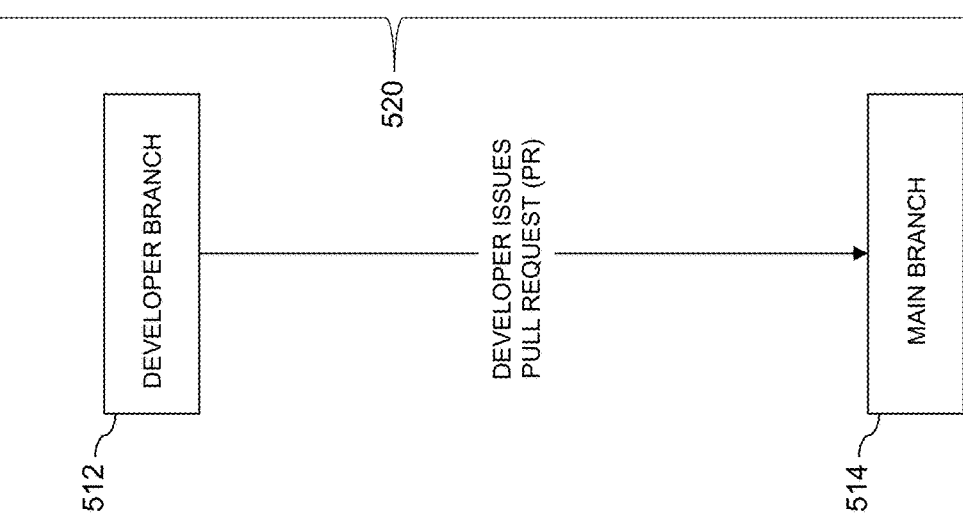

512 — DEVELOPER BRANCH

DEVELOPER ISSUES PULL REQUEST (PR)

514 — MAIN BRANCH

520

Process executed if only microservice business logic change(s) in source repository

1. CI/CD runs unit tests and checkers against the PR.

2. CI/CD builds the image.

3. CI/CD generates version, tags the image with the generated version and pushes the image to Artifactory.

4. CI/CD conducts regression test using the image built in the previous step and the configuration files that are in the main branch in the deployment repository and currently deployed in production.

5. Assuming regression test passes, developer promotes PR containing business logic change(s) to the main branch in the source repository.

6. On merge to the main branch, CI/CD generates version again, tags and pushes the image to Artifactory. The latest image tag has different Git SHA, but is otherwise identical to the one built previously. If it is decided not to include the Git SHA in the version, then this new version generation is not necessary.

7. CI/CD changes only the image version in the deployment repository, issues a PR in the deployment repository against the main branch, and merges to the main branch. No further regression test is necessary in the deployment repository. It's an auto-PR and auto-merge to reflect the new SHA (after the merge) in the deployed image.

8. Argo CD deploys the new image and restarts the microservice.

FIG. 5B

CONTINUOUS DEPLOYMENT OF MICROSERVICES OR OTHER APPLICATIONS USING SEPARATE SOURCE AND DEPLOYMENT REPOSITORIES

FIELD

The field relates generally to computer software, and more particularly to software development processes.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final testing, review and approval before new software code is deployed in production applications in the production environment. Software development processes generally implement continuous integration/continuous deployment (CI/CD) functionality to enable frequent and reliable delivery of code changes for software.

SUMMARY

Illustrative embodiments of the present disclosure provide techniques for continuous deployment of microservices or other applications using separate source and deployment repositories.

In one embodiment, a method comprises implementing a first process for carrying out an application deployment configuration change using a deployment repository, and implementing a second process for carrying out an application logic change using a source repository, separate from the deployment repository, the second process being different than the first process. The method further comprises identifying a particular type of change to be made to at least one application, and controlling execution of a particular sequence of one or more instances of at least one of the first process and the second process responsive to the identification of the particular type of change to be made to the at least one application. The method is performed by at least one processing device comprising a processor coupled to a memory.

In some embodiments, the one or more applications more particularly comprise respective microservices, although the disclosed techniques can be applied to a wide variety of other applications in addition to or in place of microservices.

The deployment repository and the source repository in some embodiments are illustratively part of a CI/CD system that controls software code for applications executed by host devices of a host platform coupled to the CI/CD system over at least one network, although other arrangements can be utilized in other embodiments.

These and other illustrative embodiments disclosed herein include, without limitation, methods, apparatus, systems and computer program products comprising processor-readable storage media.

BRIEF DESCRIPTION OF THE DRAWINGS

FIG. 4 is a flow diagram of an example method for controlling deployment of microservices or other applications in an illustrative embodiment.

FIGS. 5A and 5B show respective example processes that are executed if there are only microservice deployment configuration changes and if there are only microservice business logic changes in respective illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
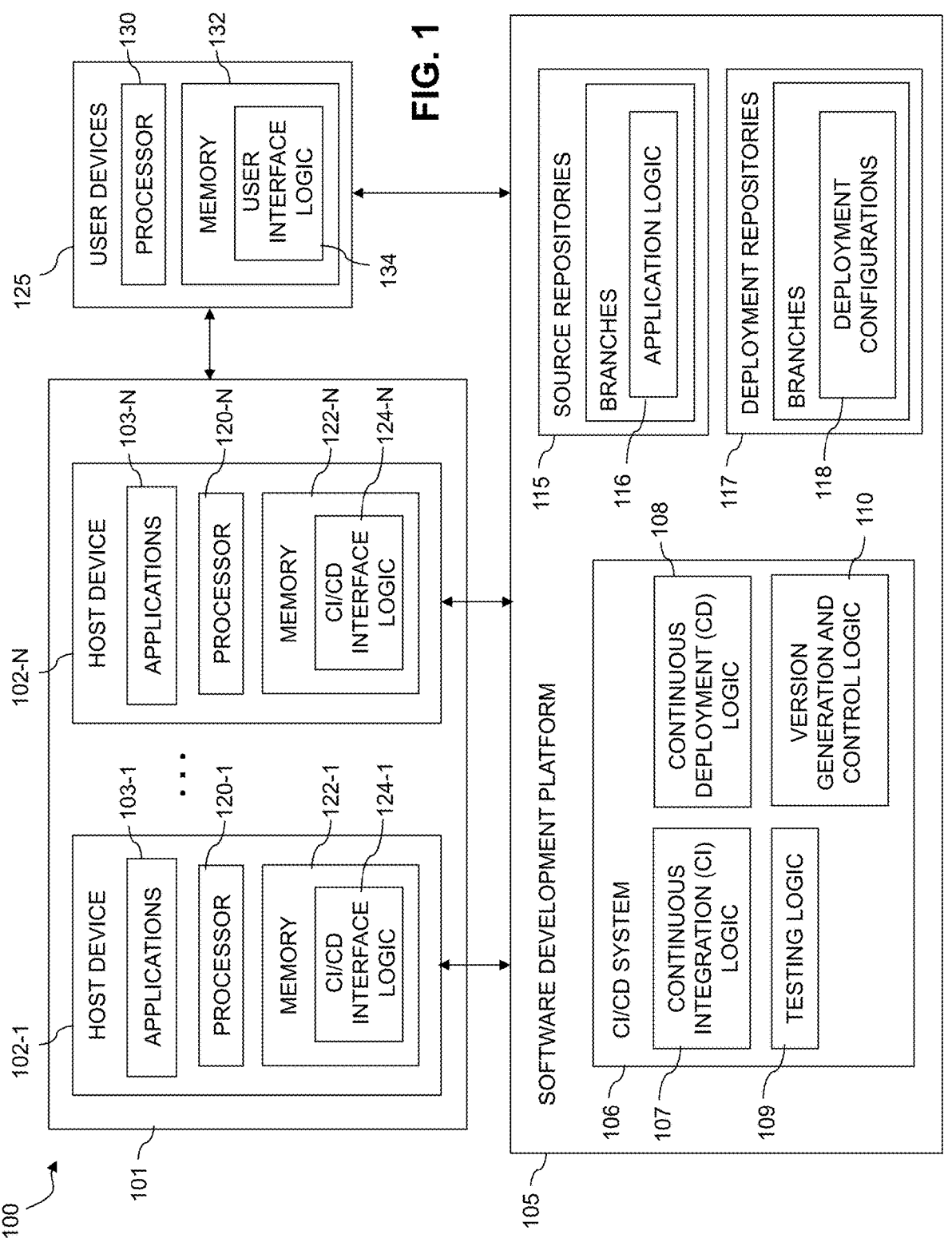
FIG. 1 is a block diagram of an information processing system configured for controlling deployment of microservices or other applications from a development platform to a host platform in an illustrative embodiment.

FIG. 1 shows an information processing system 100 configured in accordance with an illustrative embodiment. The information processing system 100 comprises a host platform 101 that includes a plurality of host devices 102-1, . . . 102-N, collectively referred to as host devices 102. The host devices 102 execute respective sets of one or more applications 103-1, . . . 103-N, collectively referred to as applications 103. It should be noted that the term "host device" as used herein is intended to be broadly construed, so as encompass, for example, at least one server, as well as a wide variety of additional or alternative types and arrangements of processing devices. A given one of the host devices 102 can therefore comprise a host system that includes multiple distinct devices of various types. Also, the term "application" as used herein is intended to be broadly construed, so as to encompass, for example, at least one microservice, and/or any of a wide variety of other types and arrangements of software code. In some embodiments, at least a portion of the applications 103 executing on the host platform 101 comprise respective microservices. These and other applications 103 are executed by the host devices 102 on behalf of one or more users of the system 100.

The host platform 101 interacts with an example software development platform 105 that illustratively comprises a continuous integration and continuous deployment (CI/CD) system 106, where the term "deployment" as broadly used herein is intended to encompass delivery, such that CI/CD as that term is used herein refers generally to continuous integration, continuous deployment and/or continuous delivery.

The CI/CD system 106 in some embodiments implements one or more CI/CD pipelines for integrating and deploying software code of the applications 103 to the host platform 101. Such CI/CD pipelines of the CI/CD system utilize CI/CD system components that illustratively include CI logic 107, CD logic 108, testing logic 109, and version generation and control logic 110. The CI/CD pipelines utilize source repositories 115 comprising application logic 116 of at least a subset of the applications 103, and deployment repositories 117 comprising deployment configurations 118 of at least a subset of the applications 103. The application logic 116 is illustratively part of one or more branches of at least one of the source repositories 115, such as at least one developer branch and a main branch, also referred to as a production branch. Similarly, the deployment configurations 118 are illustratively part of one or more branches of at least one of the deployment repositories 117, such as at least one developer branch and a main branch or a production branch. Other types and arrangements of source and deployment repositories 115 and 117 and their respective branches can be used in other embodiments. It is also to be appreciated that additional or alternative components can be implemented in the C/CD system 106 and software development platform 105 in other embodiments.

The CI/CD system 106 may comprise, for example, a commercially-available CI/CD system such as Jenkins, and/or other types of DevOps tools, suitably modified in the manner disclosed herein to provide enhanced continuous deployment functionality for microservices and other applications using separate source and deployment repositories.

The source repositories 115 and deployment repositories 117 may be viewed as comprising examples of what is more generally referred to herein as "separate" source and deployment repositories. The term "separate" as used in this context herein is intended to be broadly construed, so as to encompass, for example, repositories that have respective distinct sets of one or more branches, such as at least one developer branch and at least one main or production branch, for a given microservice or other application.

Although the source repositories 115 and the deployment repositories 117 are illustrated in the figure as being part of the software development platform 105, one or more such repositories in other embodiments can instead be implemented at least in part on one or more separate processing platforms that are external to the software development platform 105 that includes the CI/CD system 106. Numerous other arrangements of multiple processing platforms can be used to implement the software development platform 105 in other embodiments.

Also included in the system 100 are one or more sets of user devices 125. Different ones of the user devices 125 may be in communication with the host platform 101 and the software development platform 105. For example, users of the applications 103 deployed on the host platform 101 may access the host platform 101 via respective ones of a first set of user devices in the user devices 125, and users of the software development platform 105 may access the software development platform 105 via respective ones of a second set of user devices in the user devices 125. One or more of the user devices 125 may each provide certain users, such as administrators, developers, or other users, access to both the host platform 101 and the software development platform 105. The term "user" herein is intended to be broadly construed so as to encompass numerous arrangements of human, hardware, software or firmware entities, as well as combinations of such entities.

The host platform 101, software development platform 105 and user devices 125 illustratively communicate with one another over one or more networks that are not explicitly shown in the figure. For example, such a network in some embodiments illustratively utilizes protocols such as Transmission Control Protocol (TCP) and Internet Protocol (IP), and is therefore referred to herein as a TCP/IP network, although it is to be appreciated that the network can operate using additional or alternative protocols.

Accordingly, communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments may therefore comprise one or more TCP/IP networks and/or other types of networks each comprising processing devices configured to communicate using TCP, IP and/or other communication protocols.

The host platform 101 and the software development platform 105 illustratively comprise respective distinct processing platforms each implemented using one or more processing devices each having a processor and a memory, possibly implementing virtual machines and/or containers, although numerous other configurations are possible. Such processing platforms or portions thereof can be provided to users at least in part utilizing one or more of a Platform-as-a-Service (PaaS) model, an Infrastructure-as-a-Service (IaaS) model, a Function-as-a-Service (FaaS) and/or a Storage-as-a-Service (STaaS) model. In some embodiments, at least portions of the host platform 101 and the software development platform 105 may be implemented at least in part on a common processing platform. These and other processing platforms utilized to implement at least a portion of the system 100 can comprise, for example, cloud infrastructure, edge infrastructure, enterprise infrastructure and/or other arrangements of processing devices comprising processors and memory. For example, the cloud infrastructure may include one or more public clouds, one or more private clouds and/or one or more hybrid clouds. As another example, portions of information processing system 100 may be part of one or more edge computing platforms.

The host devices 102 of the host platform 101 illustratively comprise respective processing devices that in the present embodiment include corresponding instances of processors 120-1, . . . 120-N and memories 122-1, . . . 122-N, collectively referred to as processors 120 and memories 122, with the memories 122 storing software code that implements respective instances of C/CD interface logic 124-1, . . . 124-N, collectively referred to as CI/CD interface logic 124. The CI/CD interface logic 124 is illustratively configured for interfacing the host devices 102 with the CI/CD system 106 of the software development platform 105, in order to facilitate integration and deployment of software code for the applications 103, in the manner described elsewhere herein.

The user devices 125 also comprise respective instances of processor 130 and memory 132, the latter storing software code that implements respective instances of user interface logic 134, so as to allow a given one of the user devices 125 to interact with the host platform 101 and/or the software development platform 105.

In some embodiments, the host platform 101 implements a plurality of containers for implementing the applications 103, as will be described in more detail below with reference to FIGS. 2 and 3.

As the term is illustratively used herein, a "container" may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. As indicated above, the term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 2. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node, and multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique IP address enabling pods to communicate with one another, and for other system components to communicate with each pod. Still further, pods may each have persistent storage volumes associated therewith. Configuration information (e.g., one or more configuration objects) indicating how a container executes can be specified for each pod.

Figure 2:
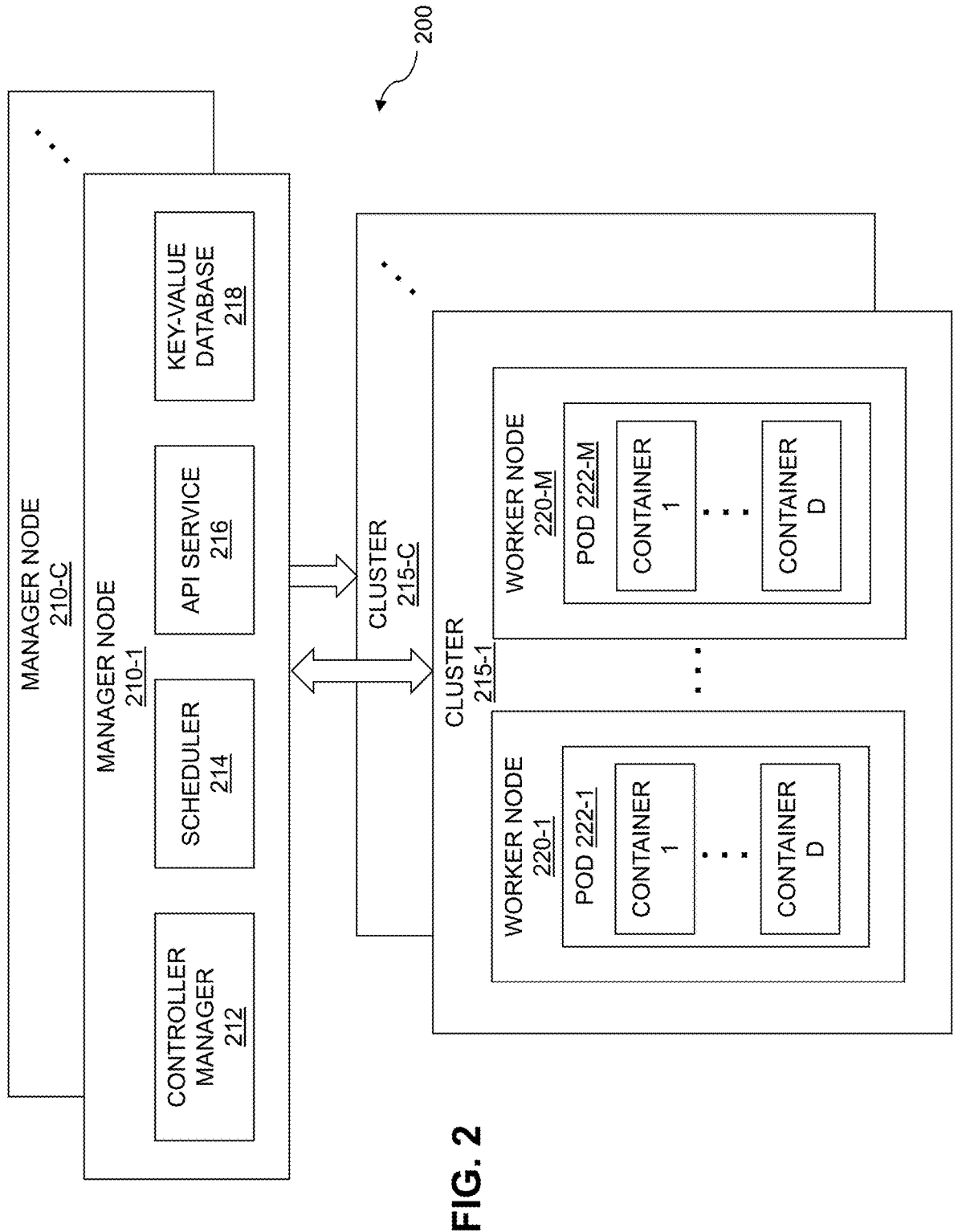
FIG. 2 shows an example of a host platform in an illustrative embodiment.

FIG. 2 shows an example of a pod-based container orchestration environment 200 that in some embodiments is used to implement at least portions of the host platform 101. As shown, a plurality of manager nodes 210-1, . . . 210-C, collectively referred to as manager nodes 210, are respectively operatively coupled to a plurality of clusters 215-1, . . . 215-C, collectively referred to as clusters 215. As indicated above, each of the clusters 215 is managed by at least one manager node.

Each of the clusters 215 comprises a plurality of worker nodes 220-1, . . . 220-M, collectively referred to as worker nodes 220. Each worker node 220 comprises a respective pod, i.e., one of a plurality of pods 222-1, . . . 222-M, collectively referred to as pods 222. However, it is to be understood that one or more worker nodes 220 can run multiple pods 222 at a time. Each pod 222 comprises a set of containers denotes as Container 1, . . . Container D, although each pod may also have a different number of containers. As used herein, a pod may be referred to more generally as a containerized workload. Also shown in FIG. 2, each of the manager nodes 210 comprises a controller manager 212, a scheduler 214, an application programming interface (API) service 216, and a key-value database 218, as will be further explained. However, in some embodiments, multiple ones of the manager nodes 210 may share one or more of the same controller manager 212, scheduler 214, API service 216, and key-value database 218.

Worker nodes 220 of each of the clusters 215 execute one or more applications associated with pods 222 (e.g., containerized workloads). Each of the manager nodes 210 manages the worker nodes 220, and therefore pods 222 and containers, in its corresponding cluster 215. More particularly, each of the manager nodes 210 controls operations in its corresponding cluster 215 utilizing the above-mentioned components, i.e., controller manager 212, scheduler 214, API service 216, and key-value database 218. In general, controller manager 212 executes control processes (e.g., controllers) that are used to manage operations in cluster 215. Scheduler 214 typically schedules pods to run on particular nodes taking into account node resources and application execution requirements such as, but not limited to, deadlines. In general, in a Kubernetes implementation, API service 216 exposes the Kubernetes API, which is the front end of the Kubernetes container orchestration system. Key-value database 218 typically provides key-value storage for all cluster data including, but not limited to, configuration data objects generated, modified, deleted, and otherwise managed, during the course of system operations.

Figure 3:
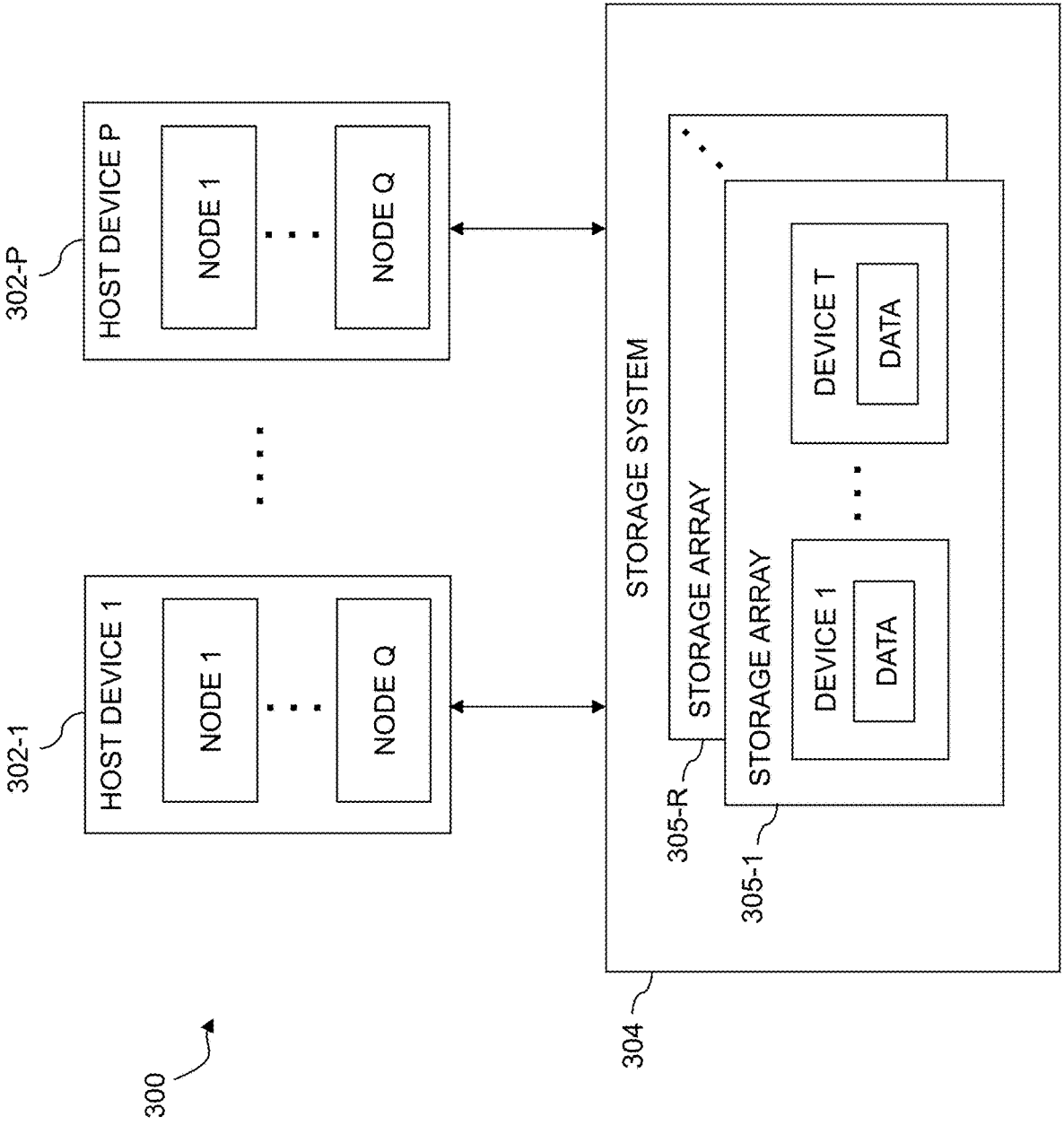
FIG. 3 shows another example of a host platform and further shows its interaction with an associated storage system in an illustrative embodiment.

Turning now to FIG. 3, an information processing system 300 is depicted within which pod-based container orchestration environment 200 of FIG. 2 can be implemented. The information processing system 300 may be viewed as comprising at least a portion of the host platform 101 of system 100. More particularly, as shown in FIG. 3, a plurality of host devices 302-1, . . . 302-P, collectively referred to as host devices 302, are operatively coupled to a storage system 304. Each host device 302 hosts a set of nodes denoted as Node 1, . . . Node Q. As indicated previously, one non-limiting example of a host device 302 is a server. Note that while multiple nodes are illustrated on each host device 302, a host device 302 can host a single node, and one or more host devices 302 can host a different number of nodes as compared with one or more other host devices 302.

As is further shown in FIG. 3, storage system 304 comprises a plurality of storage arrays 305-1, . . . 305-R, collectively referred to as storage arrays 305, each of which is comprised of a set of storage devices denoted as Device 1, . . . Device T, upon which data of one or more storage volumes is persisted. The storage volumes for which data is stored in the storage devices of each storage array 305 can include any data generated in the information processing system 300 but, more typically, include data generated, manipulated, or otherwise accessed, during the execution of one or more applications in the nodes of host devices 302.

Furthermore, any one of nodes Node 1, . . . Node Q on a given host device 302 can be a manager node 210 or a worker node 220. In some embodiments, a node can be configured as a manager node for one execution environment and as a worker node for another execution environment. Thus, the components of a pod-based container orchestration environment 200 in FIG. 2 can be implemented on one or more of host devices 302, such that data associated with pods 222 running on the nodes Node 1, . . . Node Q is stored as persistent storage volumes in one or more of the storage devices Device 1, . . . Device T of one or more of storage arrays 305.

Host devices 302 and storage system 304 of information processing system 300 are assumed to be implemented using at least one processing platform comprising one or more processing devices each having a processor coupled to a memory. Such processing devices can illustratively include particular arrangements of compute, storage and network resources. In some alternative embodiments, one or more host devices 302 and storage system 304 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of an information processing system are possible, in which certain components of the system reside in one data center in a first geographic location while other components of the system reside in one or more other data centers in one or more other geographic locations that are potentially remote from the first geographic location. Thus, it is possible in some implementations of an information processing system for portions or components thereof to reside in different data centers. Numerous other distributed implementations of an information processing system are possible. Accordingly, the constituent parts of information processing systems as disclosed herein can also be implemented in a distributed manner across multiple computing platforms.

Additional examples of processing platforms utilized to implement a host platform and/or an associated software development system will be described in more detail below in conjunction with FIGS. 7 and 8.

It is to be appreciated that these and other features of illustrative embodiments are presented by way of example only, and should not be construed as limiting in any way. Accordingly, different numbers, types and arrangements of system components can be used in other embodiments. The particular sets of components implemented in the illustrative embodiments of FIGS. 1 through 3 are therefore presented by way of example only. In other embodiments, only subsets of these components, or additional or alternative sets of components, may be used, and such components may exhibit alternative functionality and configurations. Additional examples of such embodiments will be described below.

As mentioned previously, the applications 103 in some embodiments comprise respective microservices. Additional details regarding aspects of illustrative embodiments will now be described with reference to techniques for continuous deployment of microservices in the system 100, although it is to be appreciated that such techniques can be adapted in a straightforward manner for use with a wide variety of other types of applications. In the microservice context, the application logic of a source repository is more particularly referred to herein as "business logic," as such logic implements the functionality of the microservice within the system 100. Terms such as "application logic," "business logic" and "deployment configuration" as used herein are intended to be broadly construed, and should not be viewed as being limited in any way to the features of the illustrative embodiments described below.

As indicated above, the deployment of a microservice on a host platform (e.g., a Kubernetes cluster) illustratively utilizes separate source and deployment repositories for the microservice. The source repository contains the microservice business logic and the deployment repository contains the microservice deployment configurations. However, problems can arise if there are cyclic dependencies in microservice changes between the source and the deployment repository. How to qualify the changes and deploy them as an atomic unit becomes an important issue. Additionally, continuous deployment via a CI/CD pipeline, a major objective in CI/CD systems, becomes problematic and unduly complex, often requiring extra business logic to be written in the pipeline.

Illustrative embodiments disclosed herein address these and other issues by providing a process to minimize microservice deployment time while increasing quality.

To ensure quality absent use of the process as disclosed herein, a developer may otherwise proceed as follows:

1. Make all the changes either in the source repository or in the deployment repository or in both and merge the changes to a staging branch.

2. Build the content in the staging branch and conduct a regression test, which takes content from both the repositories, to qualify the changes. Additionally, extra coordination is required between developers working in parallel in the same repository.

3. Promote changes from the staging branch to the main branch for production. The developer needs to promote the content in the repository where the changes were made or from both the repositories in case changes were made in both.

The limitations of this approach are as follows:

1. A staging branch is necessary, and it needs to be kept in synchronization with the main branch.

2. Coordination between developers working in parallel on the same repository is required to merge and test on the staging branch.

3. In addition to the staging branch, there is an additional "corner" case, which requires special handling. Suppose a configuration parameter is renamed. As explained in more detail elsewhere herein, such a rename introduces cyclic dependency between the source repository and the deployment repository because the new image, built from the source repository, will look for the renamed parameter in the updated deployment repository. In the staging branch, a developer can successfully test the new image with the newly renamed configuration parameter. However, since the deployment and source repositories are separate, the two repositories cannot be promoted as an atomic unit of change, referencing each other, unless extra business logic is written in the CI/CD pipeline.

4. The above approach is not truly continuous delivery, because the developer needs to promote to the staging branch and then conduct manual regression test in the staging branch before promoting to the production branch.

Illustrative embodiments disclosed herein provide a substantially improved process, without requiring any new component and/or other software to be written, that guides the developer and results in:

1. Requiring only a single main branch, illustratively a production branch, thereby eliminating the requirement of an intermediate staging branch.

2. Eliminating the need for conducting a manual regression test in the staging branch by the developer.

3. Allowing true continuous delivery by minimizing the time between when a pull request (PR) is created and the time when the microservice is deployed in production while ensuring quality.

Accordingly, illustrative embodiments disclosed herein address and overcome the above-noted drawbacks of alternative approaches. For example, such embodiments eliminate the need for extra logic (e.g., business logic in the CI/CD pipeline, and developer workflow steps) to handle the cyclic dependency between source repository and deployment repository, which arises in certain use cases.

Changes in the source and deployment repositories (and therefore, in the PRs issued by developers to the two repositories) can be characterized as follows:

1. Independent changes in the two repositories.

2. Dependent changes in the two repositories:

(a) Source repository PR is dependent on the deployment repository PR but not the other way around.

(b) Deployment repository PR is dependent on the source repository PR but not the other way around.

(c) Source and deployment repository PRs are mutually dependent on each other:

i. Create a new configuration parameter (because the new image needs it).

ii. Delete an existing configuration parameter (because the new image does not need it).

iii. Update the key name of an existing configuration parameter (because the new image uses the updated key name).

An example process for controlling deployment of microservices or other applications using separate source and deployment repositories will now be described in more detail with reference to the flow diagram of FIG. 4. It is to be understood that this particular process is only an example, and that additional or alternative processes for controlling deployment of microservices or other applications may be used in other embodiments.

In this embodiment, the example process includes steps 400 through 406. These steps are assumed to be performed by a CI/CD system, such as the CI/CD system 106 of the software development platform 105 in system 100, utilizing source and deployment repositories such as the source and deployment repositories 115 and 117 of the software development platform 105 in system 100.

In step 400, a CI/CD system implements a first process for carrying out an application deployment configuration change using a deployment repository. By way of example, the first process may comprise receiving a pull request for a developer branch of the deployment repository, conducting one or more tests for a deployment configuration change in the pull request, responsive to passing the one or more tests, promoting the pull request to a main branch of the deployment repository, and restarting the application, reloading an updated configuration and/or performing one or more additional or alternative actions to implement the deployment configuration change. A more detailed example of a first process of this type will be described below in conjunction with FIG. 5A, although other types of processes may be used.

In step 402, the CI/CD system implements a second process for carrying out an application logic change using a source repository, separate from the deployment repository, the second process being different than the first process. Again by way of example, the second process may comprise receiving a pull request for a developer branch of the source repository, generating an image that includes an application logic change from the pull request, conducting one or more tests using the image and one or more configuration files of a main branch of the deployment repository, responsive to passing the one or more tests, promoting the pull request to a main branch of the source repository, updating an image version for the application in the deployment repository, and restarting the application to implement the application logic change. A more detailed example of a second process of this type will be described below in conjunction with FIG. 5B, although again other types of processes may be used.

In step 404, the CI/CD system identifies a particular type of change to be made to at least one application. For example, the particular type of change can be adding a new deployment configuration to the application, deleting an existing deployment configuration from the application, renaming an existing deployment configuration in the application, changing a deployment configuration of the application without changing application logic of the application, and changing application logic of the application without changing a deployment configuration of the application. Additional or alternative changes involving deployment configurations in a deployment repository and application logic in a source repository can be detected or otherwise identified in other embodiments.

In step 406, the CI/CD system controls execution of a particular sequence of one or more instances of at least one of the first process and the second process responsive to identification of the particular type of change to be made to the at least one application.

A number of examples of the controlled execution of step 406 will now be described, assuming without limitation that the at least one application comprises one or more respective microservices, and that the application logic comprises business logic of the one or more microservices.

For example, if the particular type of change to be made to at least one microservice comprises an addition of a new configuration to the microservice, controlling execution of the particular sequence of one or more instances of at least one of the first process and the second process in step 406 illustratively comprises adding the new configuration in the deployment repository, executing an instance of the first process, changing business logic in the source repository to use the new configuration, and executing an instance of the second process.

As another example, if the particular type of change to be made to at least one microservice comprises a deletion of an existing configuration from the microservice, controlling execution of the particular sequence of one or more instances of at least one of the first process and the second process in step 406 illustratively comprises changing business logic in the source repository to not use the existing configuration, executing an instance of the second process, deleting the existing configuration in the deployment repository, and executing an instance of the first process.

As yet another example, if the particular type of change to be made to at least one microservice comprises a renaming of a configuration in the microservice, controlling execution of the particular sequence of one or more instances of at least one of the first process and the second process in step 406 illustratively comprises adding a new configuration name in the deployment repository, executing an instance of the first process, changing business logic in the source repository to use the new configuration name, executing an instance of the second process, deleting a previous configuration name in the deployment repository, and executing another instance of the first process.

As a further example, if the particular type of change to be made to at least one microservice comprises a change of configuration but not business logic in the microservice, controlling execution of the particular sequence of one or more instances of at least one of the first process and the second process in step 406 illustratively comprises changing the configuration in the deployment repository, and executing an instance of the first process without executing an instance of the second process in the particular sequence.

As an additional example, if the particular type of change to be made to at least one microservice comprises a change of business logic but not configuration in the microservice, controlling execution of the particular sequence of one or more instances of at least one of the first process and the second process in step 406 illustratively comprises changing the business logic in the source repository, and executing an instance of the second process without executing an instance of the first process in the particular sequence.

Again, the foregoing are only examples of the controlled execution of step 406, and other types of control can be implemented in other embodiments.

In some embodiments, controlling execution of the particular sequence of one or more instances of at least one of the first process and the second process responsive to the identification of the particular type of change to be made to the at least one application comprises eliminating cyclic dependencies in one or more changes that involve both the deployment repository and the source repository.

Additionally or alternatively, controlling execution of the particular sequence of one or more instances of at least one of the first process and the second process responsive to the identification of the particular type of change to be made to the at least one application illustratively comprises promoting one or more changes from a developer branch to a main branch without use of an intermediate staging branch.

Accordingly, it is to be appreciated that "controlling execution" as used herein is intended to be broadly construed. In some embodiments, such execution control is configured to include generation of one or more user interface screens that are presented via user interface logic 134 of one or more of the user devices 125, in order to guide one or more developers through an at least partially automated process such as that described below in conjunction with the illustrative embodiment of FIG. 6. Other types of at least partially automated developer guidance can be provided as part of the controlled execution of particular sequences of instances of the first and/or second processes in step 406.

One or more of steps 400 through 406 are illustratively repeated over time in order to support the disclosed functionality for continuous deployment of microservices or other applications using separate source and deployment repositories. Multiple such processes may operate in parallel with one another in order to provide continuous deployment functionality for different microservice or other applications.

The steps of the FIG. 4 process are shown in sequential order for clarity and simplicity of illustration only, and certain steps can at least partially overlap with other steps. Additional or alternative steps can be used in other embodiments to implement the disclosed continuous deployment functionality. The particular processing operations and other system functionality described in conjunction with the flow diagram of FIG. 4 are therefore presented by way of illustrative example only, and should not be construed as limiting the scope of the disclosure in any way.

Functionality such as that described in conjunction with the flow diagram of FIG. 4 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Additional illustrative embodiments will now be described with reference to FIGS. 5A, 5B and 6. These embodiments are described in the context of microservices, but like other embodiments herein, are more generally applicable to other types of applications.

As indicated previously, the changes that may be made to source and/or deployment repositories illustratively comprise independent changes in the two repositories, that is, changes that are made in one repository that do not impact the other repository, and dependent changes in the two repositories.

Each of these different types of changes will be further described below.

Independent Changes in the Two Repositories.

A developer may make a change in the source repository without being required to make any corresponding configuration changes in the deployment repository. The reverse is also true. This covers most of the use cases. Examples include the following:

1. Addition of microservice business logic, which does not require any change in microservice configuration. This requires, from a developer's point of view, only a single PR in the source repository.

2. Addition of an extra annotation in the microservice deployment in the Kubernetes cluster, which requires, from the developer's perspective, only a single PR in the deployment repository since there is no change in the microservice business logic in the source repository.

FIGS. 5A and 5B show example processes for dealing with independent changes in separate source and deployment repositories in illustrative embodiments. More particularly, FIG. 5A shows an example process that is executed if there are only microservice deployment configuration changes in a deployment repository, and FIG. 5B shows an example process that is executed if there are only microservice business logic changes in a source repository, in respective illustrative embodiments.

Referring initially to FIG. 5A, one or more changes to at least one deployment configuration of a microservice in a CI/CD system of a software development platform 500 are reflected in a PR issued by a developer, in order to promote the deployment configuration change(s) from a developer branch 502 of a deployment repository to a main branch 504 of the deployment repository. The one or more deployment configuration changes in the PR are handled by executing an instance of a first process 510 as follows:

1. The CI/CD system, denoted as simply "CI/CD" in the figure, conducts a regression test with the configuration change(s) in the PR in the deployment repository against an image which is built from the main branch in the source repository and currently deployed in production.
2. Assuming the regression test passes, the developer promotes the PR containing the configuration change(s) to the main branch in the deployment repository.
3. A declarative CT tool (e.g., Argo CD) of the CI/CD system updates the relevant objects in Kubernetes which are necessary for deployment, and restarts the deployed microservice to pick up the new change(s).

Turning now to FIG. 5B, one or more changes to business logic of a microservice in the CI/CD system of the software development platform 500 are reflected in a PR issued by a developer, in order to promote the business logic change(s) from a developer branch 512 of a source repository to a main branch 514 of the source repository. The one or more business logic changes in the PR are handled by executing an instance of a second process 520 as follows:

1. The CI/CD system, again denoted as simply "CI/CD" in the figure, runs unit tests and checkers against the PR.
2. The CI/CD system builds the image.
3. The CI/CD system generates a version, tags the image with the generated version and pushes the image to an artifacts manager (e.g., Artifactory).
4. The CI/CD system conducts a regression test using the image built in the previous step and the configuration files that are in the main branch in the deployment repository and currently deployed in production.
5. Assuming the regression test passes, the developer promotes the PR containing the business logic change(s) to the main branch in the source repository.
6. On merge to the main branch, the CI/CD system generates a version again, tags and pushes the image to the artifacts manager (e.g., Artifactory). The latest image tag has different Git hash value (also referred to as a Git SHA), but is otherwise identical to the one built previously. If it is decided not to include the Git SHA in the version, then this new version generation is not necessary.
7. The CI/CD system changes only the image version in the deployment repository, issues a PR in the deployment repository against the main branch, and merges to the main branch. No further regression test is necessary in the deployment repository. Instead, this is illustratively an auto-PR and auto-merge to reflect the new SHA (after the merge) in the deployed image.
8. A declarative CT tool (e.g., Argo CD) of the CI/CD system deploys the new image and restarts the microservice.

It should be noted that individual execution of only the respective first process 510 of FIG. 5A or second process 520 of FIG. 5B is appropriate when the changes in the deployment repository are not dependent on the changes in the source repository and vice versa. Additionally, in these example processes, the regression test is conducted with the updated content in the PR in one repository and with the content in the main branch of the other repository. For example, such individual execution in the presence of independent changes in the two repositories can be carried out as follows:

1. Developer creates a PR either in the source repository or in the deployment repository.
2. The CI/CD system takes care of invocation of the regression test, and if necessary, deployment repository update with auto-PR and auto-merge.
3. After merging in, the CI/CD system takes care of the updating of the deployment repository with the newly created image tag to deploy the microservice in production.

Dependent Changes in the Two Repositories.

As indicated previously, the dependencies between the two repositories can be classified into the following three kinds:

1. Source repository PR is dependent on the deployment repository PR but not the other way around. An example is a new image of an existing microservice that requires a new configuration parameter. While the new parameter needs to be added in the deployment repository, the updated business logic goes into the source repository. In this case, the new image does not work without the new configuration. However, the deployment repository PR with the additional parameter can be promoted to the main branch without the new image being built from the PR in the source repository, because the already deployed image is going to ignore the new parameter.
2. Deployment repository PR is dependent on the source repository PR but not the other way around. An example is deletion of an existing configuration parameter, used by the already deployed microservice image, but not to be used by the yet-to-be-deployed new image of the microservice. In this case, the source repository PR needs to be promoted first because it will ignore the extra configuration, which is already available in production. After the microservice image built from the new changes is deployed in production, the PR in the deployment repository can be merged to the main branch.
3. Source and deployment repository PRs are mutually dependent on each other. An example is modifying the name of an existing configuration parameter. Here the business logic in the source repository is tied to the configuration, present in the deployment repository. As in any modification case, this can be broken down into two steps: First, addition of a new parameter with the new name, followed by a deletion of the existing parameter with the old name. Therefore, the bi-directional dependency can be broken down into two uni-directional dependencies, corresponding to items 1 and 2 above.

Based on the above dependency classifications, any deployment configuration and business logic change can be mapped into one or more of the following example create, delete and update operations:

1. Create a new configuration parameter (because the new image needs it): The configuration change is backward compatible with the existing microservice deployment since the currently deployed microservice image is going to ignore the new configuration, in accordance with the microservice deployment repository workflow above. The deployment repository PR is created and merged first by the developer. Next, the developer creates and merges the PR in the microservice repository, which uses the new parameter. The newly deployed microservice will start utilizing the new parameter.

2. Delete an existing configuration parameter (because the new image does not need it): The configuration change is not backward compatible with the existing deployment. The source repository PR needs to be created and promoted first. It will not use an extra configuration parameter, already deployed. The deployment repository PR needs to be created and promoted next.

3. Updating the key name of an existing configuration parameter (because the new image uses the updated key name): An update can be considered as an (add+ remove). First, the developer adds a new configuration parameter of the desired name. The configuration PR needs to be created and deployed first. Next, the developer updates the business logic in the source repository to use the new configuration parameter and issues a PR. When the new microservice image is deployed, it uses the new configuration parameter. After the new microservice image is deployed, another PR, deleting the old configuration parameter, in the deployment repository, needs to be created and merged. So, in effect, two PRs in the deployment repository and one PR in the source repository. Therefore, the two deployment repository processes and one source repository process will be triggered.

Figure 6:
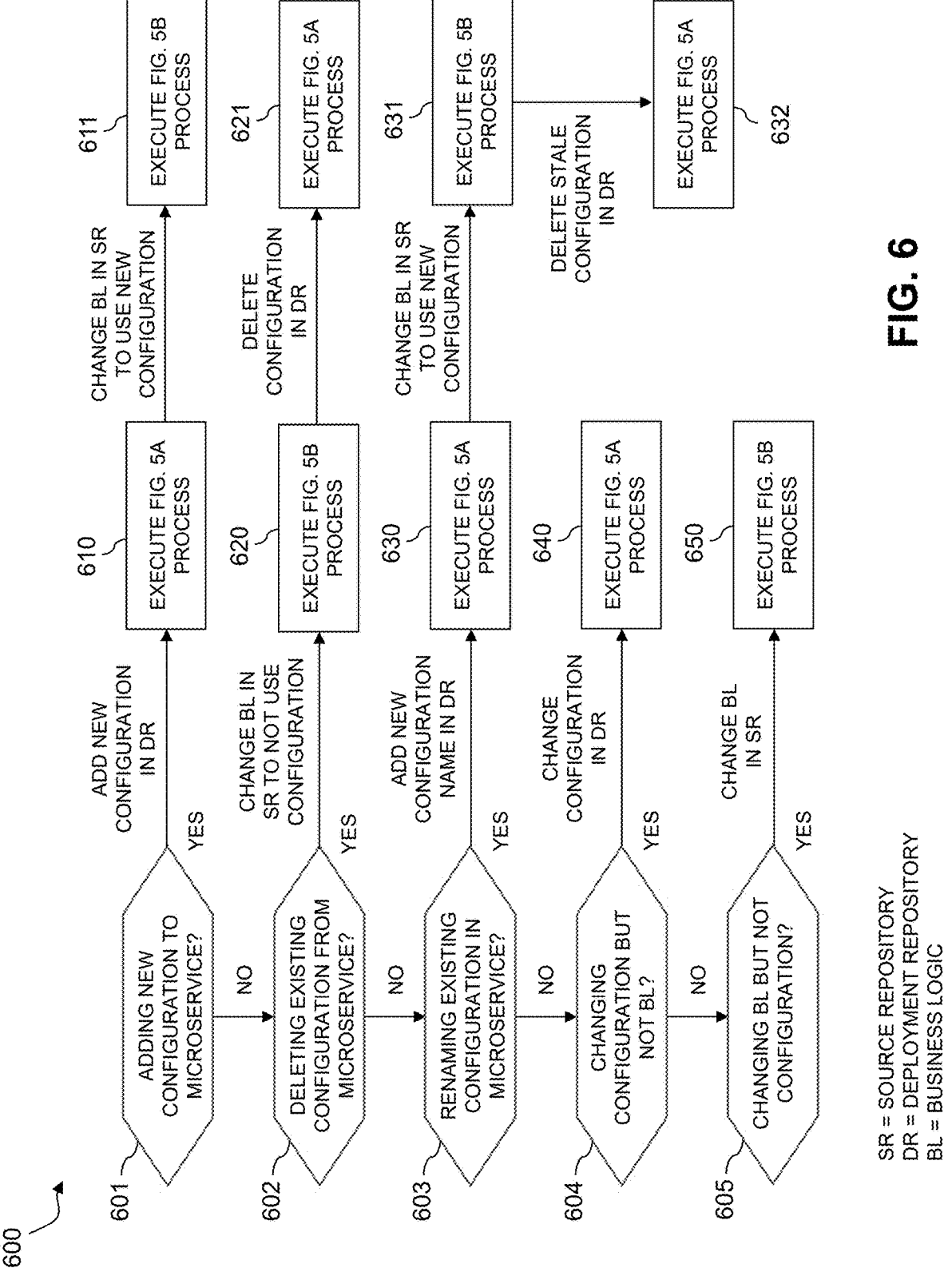
FIG. 6 is a flow diagram of an example process that initiates execution of different sequences of one or more of the example processes of FIGS. 5A and 5B responsive to identification of respective different types of microservice changes being requested.

FIG. 6 shows an example process 600 that implements the above-described techniques, and initiates execution of different sequences of one or more of the example first and second processes 510 and 520 of respective FIGS. 5A and 5B responsive to identification of respective different types of microservice changes being requested. The example process 600 of FIG. 6 provides automated assistance to a developer in deploying independent changes in the respective source and deployment repositories or dependent changes in both of the repositories.

In step 601, a determination is made as to whether or not a new configuration is being added to a microservice. Responsive to a negative determination, the process moves to step 602 as shown. Otherwise, the process adds the new configuration in the deployment repository, executes in step 610 an instance of the first process 510 of FIG. 5A, changes business logic in the source repository to use the new configuration, and executes in step 611 an instance of the second process 520 of FIG. 5B.

In step 602, a determination is made as to whether or not an existing configuration is being deleted from a microservice. Responsive to a negative determination, the process moves to step 603 as shown. Otherwise, the process changes business logic in the source repository to not use the existing configuration, executes in step 620 an instance of the second process 520 of FIG. 5B, deletes the existing configuration in the deployment repository, and executes in step 621 an instance of the first process 510 of FIG. 5A.

In step 603, a determination is made as to whether or not an existing configuration in a microservice is being renamed. Responsive to a negative determination, the process moves to step 604 as shown. Otherwise, the process adds the new configuration name in the deployment repository, executes in step 630 an instance of the first process 510 of FIG. 5A, changes business logic in the source repository to use the new configuration name, executes in step 631 an instance of the second process 520 of FIG. 5B, deletes the previous (now "stale") configuration name in the deployment repository, and executes in step 632 another instance of the first process 510 of FIG. 5A.

In step 604, a determination is made as to whether or not there is a deployment configuration change for a microservice that does not impact business logic of the microservice.

Responsive to a negative determination, the process moves to step 605 as shown. Otherwise, the process changes the configuration in the deployment repository, and executes in step 640 an instance of the first process 510 of FIG. 5A.

In step 605, a determination is made as to whether or not there is a business logic change for a microservice that does not impact deployment configuration of the microservice. Responsive to a negative determination, the process ends for the current change. Otherwise, the process changes the business logic in the source repository, and executes in step 650 an instance of the second process 520 of FIG. 5B.

Different instances of the FIG. 6 process are illustratively performed for respective different changes reflected in one or more PRs generated by one or more developers utilizing the CI/CD system. It is to be appreciated that, in these and other flow diagrams herein, the particular ordering of the steps is not limiting, and different orderings can be used, and some steps can at least partially overlap with other steps. Also, additional or alternative steps can be used in other embodiments.

The example processes of FIGS. 5A, 5B and 6, in the context of a CI/CD pipeline of a CI/CD system, advantageously decouple the configuration changes from the business logic changes for a given microservice to allow the use of a single delivery branch and enable a continuous deployment of the changes in either source repository or deployment repository or both repositories, regardless of the presence of a cyclic dependency between changes in the source and the deployment repositories.

These and other illustrative embodiments disclosed herein can provide a number of significant advantages relative to conventional arrangements.

For example, the disclosed embodiments can achieve effective continuous deployment in any development environment that includes separate source and deployment repositories, even in the presence of dependent changes to both repositories.

As another example, some embodiments advantageously eliminate the need for a staging branch and associated additional developer workflow steps to conduct manual regression tests in the staging branch. Such embodiments can also eliminate the need to coordinate between multiple developers, who are working on the same repository during promotion and testing in a staging branch.

In addition, the disclosed techniques can eliminate the need for extra logic (e.g., business logic in a CI/CD pipeline) to handle cyclic dependencies between changes to a source repository and a deployment repository.

Some embodiments can provide a substantial shortening of deployment time for application updates responsive to changes in deployment configuration and/or application logic of microservices or other applications.

It is to be appreciated that the particular advantages described above and elsewhere herein are associated with particular illustrative embodiments and need not be present in other embodiments.

Also, the particular types of information processing system features and functionality as illustrated and described herein are exemplary only, and numerous other arrangements may be used in other embodiments.

Illustrative embodiments of processing platforms utilized to implement functionality for controlling deployment of microservices or other applications as disclosed herein will now be described in greater detail with reference to FIGS. 7 and 8. Although described in the context of system 100, these platforms may also be used to implement at least portions of other information processing systems in other embodiments.

Figure 7:
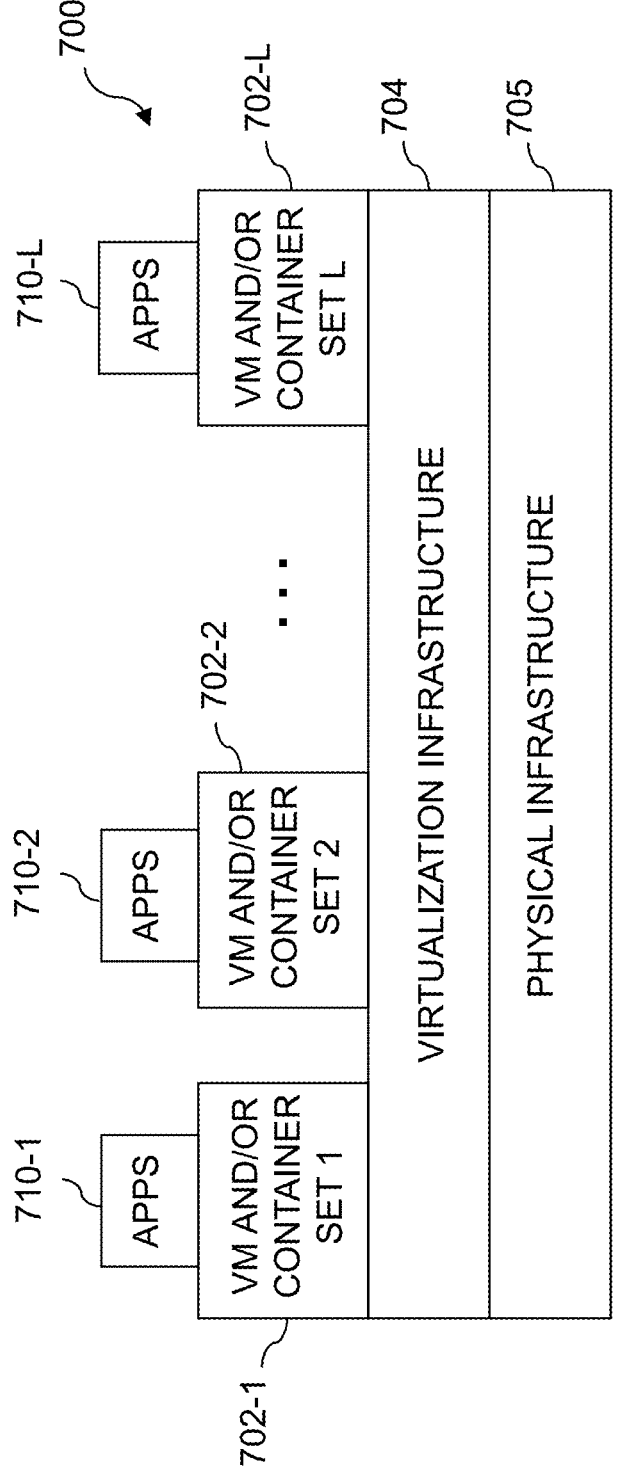
FIGS. 7 and 8 show examples of processing platforms that may be utilized to implement at least a portion of an information processing system in illustrative embodiments.
Figure 8:
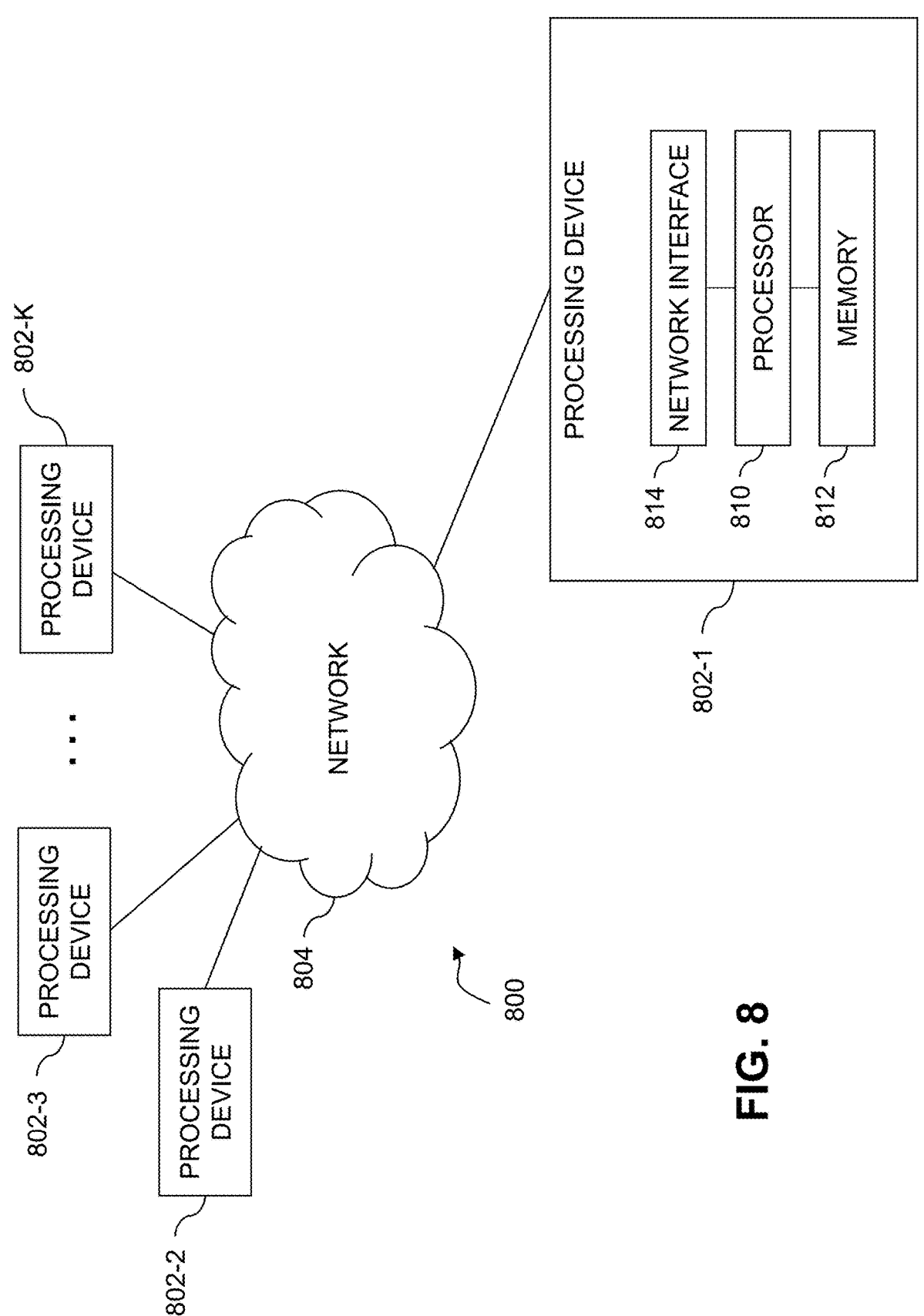

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide microservice deployment control functionality in a distributed storage system of the type described above using one or more processes running on a given one of the VMs. For example, each of the VMs can implement logic instances and/or other components for implementing functionality associated with controlling deployment of microservices or other applications in the system 100.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide dynamic resource adjustment functionality in a distributed storage system of the type described above. For example, a container host supporting multiple containers of one or more container sets can implement logic instances and/or other components for implementing functionality associated with controlling deployment of microservices or other applications in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the dynamic resource adjustment functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host platforms, host devices, microservices or other applications, software development platforms, CI/CD systems, source repositories, deployment repositories, branches, application logic, deployment configurations, and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

implementing a first process for carrying out an application deployment configuration change using a deployment repository;

implementing a second process for carrying out an application logic change using a source repository, separate from the deployment repository, the second process being different than the first process;

identifying at least one particular type of change to be made to at least one application; and controlling execution of at least one particular sequence of one or more instances of at least one of the first process and the second process responsive to the identification of at least one particular type of change to be made to the at least one application;

wherein identifying at least one particular type of change to be made to the at least one application comprises identifying an addition of a new configuration to at least a portion of the at least one application, and controlling execution of at least one particular sequence of one or more instances of at least one of the first process and the second process comprises:

adding the new configuration in the deployment repository;

executing an instance of the first process;

changing business logic in the source repository to use the new configuration; and executing an instance of the second process;

wherein the method is performed by at least one processing device comprising a processor coupled to a memory.

2. The method of claim 1 wherein the deployment repository and the source repository are part of a continuous integration/continuous deployment (CI/CD) system that controls software code for applications executed by host devices of a host platform coupled to the CI/CD system over at least one network.

3. The method of claim 1 wherein the first process for carrying out the application deployment configuration change using the deployment repository comprises:

receiving a pull request for a developer branch of the deployment repository;

conducting one or more tests for a deployment configuration change in the pull request;

responsive to passing the one or more tests, promoting the pull request to a main branch of the deployment repository; and restarting the application and/or reloading an updated configuration to implement the deployment configuration change.

4. The method of claim 1 wherein the second process for carrying out the application logic change using the source repository comprises:

receiving a pull request for a developer branch of the source repository;

generating an image that includes an application logic change from the pull request;

conducting one or more tests using the image and one or more configuration files of a main branch of the deployment repository;

responsive to passing the one or more tests, promoting the pull request to a main branch of the source repository;

updating an image version for the application in the deployment repository; and restarting the application to implement the application logic change.

5. The method of claim 1 wherein the one or more applications comprise respective microservices.

6. The method of claim 1 wherein the one or more applications comprise respective microservices and wherein identifying at least one particular type of change to be made to at least one microservice comprises identifying a deletion of an existing configuration from the microservice, and controlling execution of at least one particular sequence of one or more instances of at least one of the first process and the second process further comprises:

changing business logic in the source repository to not use the existing configuration;

executing an instance of the second process;

deleting the existing configuration in the deployment repository; and executing an instance of the first process.

7. The method of claim 1 wherein the one or more applications comprise respective microservices and wherein identifying at least one particular type of change to be made to at least one microservice comprises identifying a renaming of a configuration in the microservice, and controlling execution of at least one particular sequence of one or more instances of at least one of the first process and the second process further comprises:

adding a new configuration name in the deployment repository;

executing an instance of the first process;

changing business logic in the source repository to use the new configuration name;

executing an instance of the second process;

deleting a previous configuration name in the deployment repository; and executing another instance of the first process.

8. The method of claim 1 wherein the one or more applications comprise respective microservices and wherein identifying at least one particular type of change to be made to at least one microservice comprises identifying a change of configuration but not business logic in the microservice, and controlling execution of at least one particular sequence of one or more instances of at least one of the first process and the second process further comprises:

changing the configuration in the deployment repository;

executing an instance of the first process without executing an instance of the second process in the particular sequence.

9. The method of claim 1 wherein the one or more applications comprise respective microservices and wherein identifying at least one particular type of change to be made to at least one microservice comprises identifying a change of business logic but not configuration in the microservice, and controlling execution of at least one particular sequence of one or more instances of at least one of the first process and the second process further comprises:

changing the business logic in the source repository; and executing an instance of the second process without executing an instance of the first process in the particular sequence.

10. The method of claim 1 wherein controlling execution of at least one particular sequence of one or more instances of at least one of the first process and the second process responsive to the identification of the particular type of change to be made to the at least one application further comprises eliminating cyclic dependencies in one or more changes that involve both the deployment repository and the source repository.

11. The method of claim 1 wherein controlling execution of at least one particular sequence of one or more instances of at least one of the first process and the second process responsive to the identification of the particular type of change to be made to the at least one application further comprises promoting one or more changes from a developer branch to a main branch without use of an intermediate staging branch.

12. A computer program product comprising a non-transitory processor-readable storage medium having stored therein program code of one or more software programs, wherein the program code when executed by at least one processing device causes the at least one processing device:

to implement a first process for carrying out an application deployment configuration change using a deployment repository;

to implement a second process for carrying out an application logic change using a source repository, separate from the deployment repository, the second process being different than the first process;

to identify at least one particular type of change to be made to at least one application; and to control execution of at least one particular sequence of one or more instances of at least one of the first process and the second process responsive to the identification of at least one particular type of change to be made to the at least one application;

wherein identifying at least one particular type of change to be made to the at least one application comprises identifying an addition of a new configuration to at least a portion of the at least one application, and controlling execution of at least one particular sequence of one or more instances of at least one of the first process and the second process comprises:

adding the new configuration in the deployment repository:

executing an instance of the first process:

changing business logic in the source repository to use the new configuration; and executing an instance of the second process.

13. The computer program product of claim 12 wherein the first process for carrying out the application deployment configuration change using the deployment repository comprises:

receiving a pull request for a developer branch of the deployment repository;

conducting one or more tests for a deployment configuration change in the pull request;

responsive to passing the one or more tests, promoting the pull request to a main branch of the deployment repository; and restarting the application and/or reloading an updated configuration to implement the deployment configuration change.

14. The computer program product of claim 12 wherein the second process for carrying out the application logic change using the source repository comprises:

receiving a pull request for a developer branch of the source repository;

generating an image that includes an application logic change from the pull request;

conducting one or more tests using the image and one or more configuration files of a main branch of the deployment repository;

responsive to passing the one or more tests, promoting the pull request to a main branch of the source repository;

updating an image version for the application in the deployment repository; and restarting the application to implement the application logic change.

15. An apparatus comprising:

at least one processing device comprising a processor coupled to a memory;

the at least one processing device being configured:

to implement a first process for carrying out an application deployment configuration change using a deployment repository;

to implement a second process for carrying out an application logic change using a source repository, separate from the deployment repository, the second process being different than the first process;

to identify at least one particular type of change to be made to at least one application; and to control execution of at least one particular sequence of one or more instances of at least one of the first process and the second process responsive to the identification of at least one particular type of change to be made to the at least one application;

wherein identifying at least one particular type of change to be made to the at least one application comprises identifying an addition of a new configuration to at least a portion of the at least one application, and controlling execution of at least one particular sequence of one or more instances of at least one of the first process and the second process comprises:

adding the new configuration in the deployment repository:

executing an instance of the first process;

changing business logic in the source repository to use the new configuration; and executing an instance of the second process.

16. The apparatus of claim 15 wherein the one or more applications comprise respective microservices and wherein identifying at least one particular type of change to be made to at least one microservice comprises identifying a deletion of an existing configuration from the microservice, and controlling execution of at least one particular sequence of one or more instances of at least one of the first process and the second process further comprises:

changing business logic in the source repository to not use the existing configuration;

executing an instance of the second process;

deleting the existing configuration in the deployment repository; and executing an instance of the first process.

17. The apparatus of claim 15 wherein the one or more applications comprise respective microservices and wherein identifying at least one particular type of change to be made to at least one microservice comprises identifying a renaming of a configuration in the microservice, and controlling execution of at least one particular sequence of one or more instances of at least one of the first process and the second process further comprises:

adding a new configuration name in the deployment repository;

executing an instance of the first process;

changing business logic in the source repository to use the new configuration name;

executing an instance of the second process;

deleting a previous configuration name in the deployment repository; and executing another instance of the first process.

18. The apparatus of claim 15 wherein the one or more applications comprise respective microservices and wherein identifying at least one particular type of change to be made to at least one microservice comprises identifying a change of configuration but not business logic in the microservice, and controlling execution of at least one particular sequence of one or more instances of at least one of the first process and the second process further comprises:

changing the configuration in the deployment repository;

executing an instance of the first process without executing an instance of the second process in the particular sequence.

19. The apparatus of claim 15 wherein the one or more applications comprise respective microservices and wherein identifying at least one particular type of change to be made to at least one microservice comprises identifying a change of business logic but not configuration in the microservice, and controlling execution of at least one particular sequence of one or more instances of at least one of the first process and the second process further comprises:

changing the business logic in the source repository; and executing an instance of the second process without executing an instance of the first process in the particular sequence.

20. The apparatus of claim 15 wherein controlling execution of at least one particular sequence of one or more instances of at least one of the first process and the second process responsive to the identification of the particular type of change to be made to the at least one application further comprises at least one of (i) eliminating cyclic dependencies in one or more changes that involve both the deployment repository and the source repository, and (ii) promoting one or more changes from a developer branch to a main branch without use of an intermediate staging branch.

\* \* \* \* \*